United States Patent [19]

Veres

[11] 3,929,494

[45] Dec. 30, 1975

[54] SEALANT FOR GLASS-CERAMIC SURFACES

[75] Inventor: Frank Veres, Sylvania Township, Lucas County, Ohio

[73] Assignee: Owens-Illinois, Inc., Toledo, Ohio

[22] Filed: Dec. 22, 1972

[21] Appl. No.: 317,558

[52] U.S. Cl. .............. 106/40 R; 106/39.7; 106/52
[51] Int. Cl.² ................................. C04B 33/00
[58] Field of Search ..................... 106/40 R, 39.7

[56] References Cited
UNITED STATES PATENTS

| | | | |
|---|---|---|---|
| 3,112,184 | 11/1963 | Hollenbach | 106/39.6 |
| 3,157,522 | 11/1964 | Stookey | 106/39.7 |
| 3,251,403 | 5/1966 | Smith | 106/39.6 |
| 3,279,931 | 10/1966 | Olcott | 106/39.7 |
| 3,282,712 | 11/1966 | Tashiro et al. | 106/39.7 |
| 3,634,111 | 1/1972 | Foster et al. | 106/40 R |

FOREIGN PATENTS OR APPLICATIONS

| | | | |
|---|---|---|---|
| 1,118,368 | 7/1968 | United Kingdom | 106/39.7 |
| 45-4869 | 2/1970 | Japan | 106/39.7 |

*Primary Examiner*—Patrick P. Garvin
*Assistant Examiner*—Mark Bell
*Attorney, Agent, or Firm*—Charles S. Lynch; E. J. Holler

[57] ABSTRACT

A foaming sealant or cement for use in securely joining shaped thermally crystallizable glass bodies and shaped glass-ceramic bodies previously formed by thermal in situ crystallization of thermally crystallizable shaped glass bodies wherein the sealant consists essentially of from (1) about 80–99 percent by weight of a glass frit having $SiO_2$, $Al_2O_3$, $Li_2O$ and usually $CeO_2$ as the essential ingredients, (2) about 2–15 percent by weight of ZnO powder when the mole percent of the $CeO_2$ in the glass frit is below about 2, and (3) an amount by weight of SiC powder sufficient to be decomposed during the firing of the sealant to form gas which, in turn, foams the sealant. Such sealant can be fired and bonded to shaped glass-ceramic bodies at temperatures below 2192°F and as low as 2150°F and even lower. The sealant is dimensionally stable when subjected to high temperatures over long periods of time and has an average coefficient of thermal expansion of from about $-15 \times 10^{-7}$ up to $+10 \times 10^{-7}/°C$ over the range of from 0°–800°C.

15 Claims, No Drawings

SEALANT FOR GLASS-CERAMIC SURFACES

With the advent of glass-ceramics formed by thermal in situ crystallization of thermally crystallizable glasses wherein such glass-ceramics have low coefficients of expansion, approaching and even reaching zero expansion, the uses for such glass-ceramics have expanded into may diverse fields and a plurality of glass-ceramic structures are now known. For example, heat exchangers for gas turbine engines, exhaust reactors for substantially completely burning the by-products of combustion of internal combustion engines, liners for manifolds which transport combustion gases from the cylinders of automotive engines to the exhaust system, and like structures which must withstand high temperatures over long periods of time, are being developed from glass-ceramics. These structures consist of from several to many different parts or members which must be secured together and must remain secured during the operation of the structures for periods of time in excess of 1,000, 2,000 or more hours, depending on the structures.

In copending U.S. applications, Ser. No. 30,859, filed Apr. 22, 1970, now abandoned, and Ser. No. 146,665, filed May 25, 1971, both of which are assigned to the same assignee as the present invention, there is disclosed a matrix of integrally fused, parallel tubes forming a series of smooth, longitudinal, parallel passageways therethrough wherein the walls defining the passageways consist essentially of an inorganic crystalline oxide ceramic material having essentially zero porosity. A regenerative heat exchanger comprising such a matrix is also disclosed. In one embodiment, the heat exchanger is provided with an opening at the center of the matrix and a glass-ceramic hub, preferably of the same glass-ceramic material as the matrix, or at least having substantially the same coefficient of thermal expansion as the matrix material, is disposed within the opening and is secured to the inner wall area of the matrix opening. In another embodiment, a glass-ceramic rim member is secured about the outer periphery of the matrix. Since the regenerator is continuously rotating during the operation of the gas turbine engine and is subjected to temperatures as high as 1500°F during such operation, it is essential to the continued operation of the engine that the hub and/or rim members of the regenerator remain securely fastened to the matrix, even though each of such members not only is subjected to the high operating temperatures but also to the numerous stresses and strains caused by such rotation, and also by rapid heating and cooling cycles.

In copending U.S. application, Ser. No. 127,127, filed Mar. 23, 1971, now U.S. Pat. No. 3,807,173, also assigned to the same assignee as the present invention, there is disclosed an exhaust reactor for reducing the amount of environmental pollutants introduced into the atmosphere as a result of the exhaust gases normally produced and emitted by an internal combustion engine. The reactor is operative to maintain the temperature of the combustion gas effluent from a combustion engine at a high enough level for a sufficient period of time after the gas leaves the primary combustion zone to burn a substantial portion of the products of combustion, thus decreasing the amount of pollutants, particularly CO and hydrocarbons which are emitted into the atmosphere. The reactor, which is a glass-ceramic cylinder, comprises a first reaction zone which receives the high temperature combustion gases directly from the engine cylinder and permits combustion of at least a substantial portion of the pollutants therein. A second reaction zone, formed by a matrix of parallel, fused, glass-ceramic tubes of relatively small diameter extending longitudinally and disposed about the glass-ceramic cylinder defining the first reaction zone and with the cylinder, forms a core assembly therewith. A cupshaped, glass-ceramic end cap is secured to each end of the aforesaid core assembly to enclose the reaction zones. A plurality of openings are cut through several layers of the fused tubes, some of which openings extend into and communicate with the first reaction zone to form inlet passages for the gases and at least one of which extends into and communicates with the second zone to provide an outlet for the gases. Glass-ceramic sleeves are securely fastened within these openings and define ports for the gases passing through the exhaust reactor. For successful operation of the exhaust reactor over a substantial portion of the life of the automotive vehicle, it becomes extremely important that the aforementioned glass-ceramic end-caps and sleeves remain securely held in place on the reactor at all times.

One way for securing glass-ceramic members together is by flame treating the surfaces to be joined until fusion occurs. Another way is by the use of known sealing glasses or solder glasses which crystallize upon firing to form a glass-ceramic seal, bonding the members together. However, most of these known cements will shrink when subjected to the high firing temperatures necessary to cause sealing. If the space between the glass-ceramic members being sealed and which is filled with the sealing glass, such as the space between the hub and the inner walls of the central opening in the regenerator matrix referred to above, does not remain completely filled after firing, the resultant bonding will be poor and weak, and the hub will readily detach itself from the matrix during the operation of the regenerator.

U.S. Pat. No. 3,634,111, granted Jan. 11, 1972, discloses a foaming cement for joining together ceramic members. The cement has a batch composition consisting of about 0.25–5 percent SiC and the remainder is substantially all a glass consisting essentially, by weight on the oxide basis, of about 2.5–7 percent $Li_2O$, 10–30% $Al_2O_3$, 58–80% $SiO_2$, and 0.25–5% $TiO_2$. The cements of the patent are disclosed particularly for bonding a ceramic honeycomb body within a solid ceramic rim and require firing temperatures of about 1200°–1400°C (2192°–2552°F). While it may be that the honeycomb matrix structure referred to in the patent can withstand such high firing temperatures, since the structure is cold-formed to shape from a glass frit and then sintered, some glass-ceramic shaped bodies, formed in the viscous glass state cannot withstand such high firing temperatures without being deleteriously affected, for example, by developing pores which weaken the glass-ceramic bodies while simultaneously expanding such bodies due to the pore formation, or by a slumping or deformation of shape as the glass phase-crystal phase equilibrium shifts toward glass.

U.S. Pat. No. 3,634,111 also discloses that the foaming cement has a positive coefficient of expansion of from about 0 to +10 × $10^{-7}$/°C over a range of 25°–800°C.

Accordingly, it is an object of this invention to provide a foaming sealant or cement for glass-ceramic bodies, which sealant can be fired at temperatures as low as about 2150°F or even lower, and has excellent dimensional stability when subjected to high temperatures over long periods of time.

It is another object of this invention to provide a foaming sealant or cement which can be used for sealing glass-ceramic bodies having negative coefficient of expansion, i.e. less than $0 \times 10^{-7}/°C$ over a range of from 0°–800°C, which sealant can have an expansion coefficient of less than 0 to about $-15 \times 10^{-7}/°C$ (0°–800°C) so that the expansion coefficients of the sealant and of the glass-ceramic bodies can be substantially the same, thus minimizing the risk of cracking or rupturing occurring at the sealed areas as the parts are heated during operation of the structures, such as a regenerator, exhaust reactor and the like.

Still another object of this invention is to provide a foaming sealant or cement for securing glass-ceramic surfaces together wherein the bond strength of the sealant does not deteriorate when subjected to a plurality of heat shock cycles, by high temperatures, etc.

In attaining these objects, one feature resides in having the sealant or cement consist essentially of a glass frit of the $SiO_2$-$Al_2O_3$-$Li_2O$-$CeO_2$ system as the predominant portion of the sealant and from about 2–15 percent by weight of the sealant being ZnO, if the amount of $CeO_2$ in the glass frit is below about 2 mole percent. If such $CeO_2$ amount is at least 2 mole percent, then the amount of ZnO required can be less than 2 weight percent, and can even be omitted. SiC is present in the sealant in an amount sufficient to be decomposed upon firing of the sealant to form a gas which, in turn, causes the sealant to foam prior to its crystallization and form a seal having a plurality of small cells distributed therethrough.

Other objects, features and advantages will be more apparent from the following description of the invention.

It has been found that foaming sealants or cements suitable for bonding glass-ceramic surfaces together, wherein the glass-ceramic was previously formed by thermally in situ crystallizing a thermally crystallizable glass, which sealants can be fired at temperatures as low as 2150°F and lower, which sealants are dimensionally stable at high temperatures over a considerable period of time, and which sealants can have an average coefficient of expansion of from negative $15 \times 10^{-7}$ to positive $10 \times 10^{-7}/°C$ over the range zero to 800°C, consist essentially of (a) about 80–99, usually 80–97, weight percent of a glass frit consisting essentially of, in weight percent 54–80 $SiO_2$, 14–32 $Al_2O_3$, 3–8 $Li_2O$, 0–9 ZnO and 0–7 $CeO_2$, wherein the mol ratio of ($Li_2O$ + ZnO):$Al_2O_3$ is from 0.7 to 1.2 and the molar ratio of $Li_2O$:ZnO is at least 2, (b) zero to 15 weight percent of particulate ZnO, (c) zero to 6 weight percent of particulate $CeO_2$, and (d) a sufficient amount of particulate SiC which, upon firing of said sealant, will decompose to evolve a gas for foaming said sealant during said firing, wherein the total ZnO in the sealant is not over 15 weight percent of the sealant and is at least 2 weight percent of the sealant when the $CeO_2$ component of glass component (a) is less than 2 mol percent thereof; and wherein the total weight percent $CeO_2$ in the sealant does not exceed 7 weight percent.

The amount of SiC is sufficient to form adequate gaseous carbon oxides to foam the sealant to form a plurality of cells distributed substantially throughout the seal. SiC is present in an effective amount, usually in amounts from about 1 to about 4 or 5 percent by weight. More usually, at least about 2.5 percent of the SiC is used. Further, the maximum amount of SiC is most usually not over 3.5 percent by weight of the sealant composition. Amounts in excess of that necessary for adequate foaming may result in deleterious effects on the foaming process while, at the same time, unnecessarily increasing the amount of $SiO_2$ in the final composition beyond what is prescribed for that particular sealant. Excess SiC also entails the risk of having some SiC remain as an impurity in the fired sealant.

If the amount of $CeO_2$ in the glass is at least 2 mole percent, then particulate ZnO is not necessary in the sealant for proper firing and foaming.

In a preferred embodiment of the sealant composition, the ZnO is present in an amount of from about 8–15 percent by weight of the sealant composition, particularly when lower sealant temperatures are desired.

While, as has been noted, the glass component of the sealant of the invention can be devoid of $CeO_2$, the usual glasses of the invention, useful in particulate or fritted form, in the sealant of the invention, consist essentially, in weight percent, of 54–80 $SiO_2$, 14–32 $Al_2O_3$, 3–8 $Li_2O$, about 1–7 $CeO_2$, usually 2–7 $CeO_2$, and, optionally, zero to 9 ZnO.

Several glass compositions of the invention were made in accordance with the invention from the following batches:

TABLE I

| BATCH INGREDIENTS | PARTS BY WEIGHT | | | | | | | | | |
|---|---|---|---|---|---|---|---|---|---|---|
| | 1 | 2 | 3 | 4 | 5 | 6 | 7 | 8 | 9 | 10 |
| Ottawa Silica | 2874.5 | 2950 | 2731.4 | 3057.3 | 2951.1 | 2859.3 | 2164.3 | 3142.7 | 3038 | 2942.3 |
| Alcoa Alumina A-10 | 710 | 721.2 | 878 | 744.1 | 718.3 | 690.1 | 1270 | 595.2 | 739.6 | 716.3 |
| Lithium Carbonate | 470 | 463 | 563 | 475 | 460 | 422 | 806 | 383 | 473 | 458 |
| Cerium Oxide | 195 | 161 | 230 | 30 | 188.5 | 362 | 332 | 156 | 62 | 188 |
| Magnesium Carbonate | 12.3 | — | — | — | — | — | — | — | — | — |
| Sodium Carbonate | 21 | — | — | — | 20.7 | — | — | — | — | 41.4 |
| Arsenic Trioxide | 32 | — | — | — | — | — | — | — | — | — |
| Zinc Oxide | 4 | — | — | — | — | — | — | — | — | — |

The batch of Example 1 was charged over a period of three hours into a fused silica crucible in a gas-fired furnace having a temperature of 2900°F and then was held at this temperature for an additional 18 hours while being periodically stirred. The molten glass was then fritted by pouring it into cold water. The frit was then crushed, ground for 12 hours in a ball mill and passed through a 325 mesh sieve (as expressed on the Tyler scale). The other batches were made into glasses and fritted in substantially the same manner.

Each of the glasses formed from the batches of Table I had the following analyzed compositions:

TABLE II

| INGREDIENTS | EXAMPLES IN WEIGHT PERCENT | | | | | | | | | |
|---|---|---|---|---|---|---|---|---|---|---|
| | 1 | 2 | 3 | 4 | 5 | 6 | 7 | 8 | 9 | 10 |
| $SiO_2$ | 71.7 | 73.6 | 68.3 | 76.2 | 73.8 | 71 | 54.3 | 78.4 | 75.9 | 73.1 |
| $Al_2O_3$ | 18.3 | 18.8 | 22 | 18.6 | 18.2 | 18.2 | 31.6 | 15.3 | 18.4 | 18.2 |
| $Li_2O$ | 4.6 | 4.5 | 5.5 | 4.6 | 4.6 | 4.1 | 7.8 | 3.8 | 4.7 | 4.6 |
| $CeO_2$ | 3.7 | 3.1 | 4.2 | 0.6 | 3.3 | 6.4 | 5.9 | 2.8 | 1.1 | 3.4 |
| MgO | 0.3 | — | — | — | — | — | — | — | — | — |
| $Na_2O$ | 0.4 | — | — | — | 0.4 | — | — | — | — | 0.6 |
| $As_2O_3$ | 0.7 | — | — | — | — | — | — | — | — | — |
| ZnO | 0.1 | — | — | — | — | — | — | — | — | — |
| Mole % of $CeO_2$ | 1.42 | 1.13 | 1.54 | .21 | 1.21 | 2.44 | 2.27 | 1.0 | .41 | 1.26 |

Each of the above glass frits was mixed with silicon carbide, SiC, having a particle size below 6 microns, with the maximum particle size of SiC being 15 microns, and with ZnO powder having a particle size below 200 mesh, in the amounts indicated below in Table III.

Each of the sealant batches was ball-milled in a porcelain jar with alumina balls for two hours and then moistened to a dry-press consistency by adding a small amount of binder thereto such as an aqueous solution of ethylene glycol and polyvinyl chloride. The moistened powder was pressed at about 2000 to 3000 psi in a steel die to form bars of rectangular cross-section of the dimensions 5/16 inch × 5/16 inch × 5 inches and then fired at the temperatures and for the times indicated in Table III. The foaming qualities of each sealant was then assessed. It will be appreciated that the sealant can also be applied to the surfaces to be sealed in the form of a slurry, either in water or in an inert organic liquid which volatilizes upon being heated to the firing temperatures of the sealant. Alcohols, such as butyl alcohol, and volatile liquids such as xylene, toluene and the like can be used for this purpose.

TABLE IV

| Treatment | Rate °F/hr | To Temperature, °F | Hold Time (Hours) |
|---|---|---|---|
| A | 100 | 2150 | 10 |
| | 50 | 1700 | 0 |
| | 100 | Room Temp. | |
| B | 100 | 2200 | 10 |
| | 50 | 1700 | 0 |
| | 100 | Room Temp. | |
| C | 100 | 2300 | 10 |
| | 50 | 1700 | 0 |
| | 100 | Room Temp. | |
| D | 100 | 2050 | 10 |
| | 50 | 1700 | 0 |
| | 100 | Room Temp. | |
| E | 300 | 2192 | 4 |
| | 150 | Room Temp. | |

Although 100°F/hour heating rates are shown in Table IV, and rates of such order are usually used in sealing large glass-ceramics together, such as the hub section to the central opening in a regenerator wheel, a heating rate of 300°F per hour and even a higher rate may be used for certain glass-ceramic surfaces being bonded or sealed together.

Sealants were formed containing varying amounts of ZnO and SiC and then subjected to various heat treatment schedules to ascertain their foaming properties. The results are set forth in the following Table V.

TABLE III

| Examples | SEALANT BATCH FORMULATIONS — WEIGHT PERCENT | | | | | | | | | |
|---|---|---|---|---|---|---|---|---|---|---|
| | 11 | 12 | 13 | 14 | 15 | 16 | 17 | 18 | 19 | 20 |
| Glass Frit of Examples: | 1 | 2 | 3 | 4 | 5 | 6 | 7 | 8 | 9 | 10 |
| Amount of Frit | 84.1 | 84.2 | 84.2 | 84.2 | 81.7 | 84.2 | 81.7 | 84.2 | 88.7 | 94.7 |
| ZnO | 12.6 | 12.5 | 12.5 | 12.5 | 15 | 12.5 | 15 | 12.5 | 8 | 2 |
| SiC | 3.3 | 3.3 | 3.3 | 3.3 | 3.3 | 3.3 | 3.3 | 3.3 | 3.3 | 3.3 |
| *Temperature Treatment | E | B | B | A | A | B | B | B | C | C |
| **Foam Quality | 3 | 3.5 | 3 | 0 | 3.5 | 3 | 3 | 2.5 | 3.5 | 2 |
| ***Expansion | −1.0 | −10.1 | −7.8 | — | −3.7 | −6.0 | 0.7 | −6.6 | −13.5 | −6.9 |

*The temperature treatments referred to in Table III are as set forth in Table IV, wherein the heating rate in °F, the temperature to which the sealant is heated or cooled and the length of time at which the sealant is held at that temperature, are set forth.

**The foam quality was evaluated on the following scale:
   0 — No foam
   1 — Beginning of foam
   2 — Less than optimum foam
   3 — Optimum foam
   4 — Slightly more than optimum foam
   5 — Bloated and excessive foam
When foams appeared to be intermediate of the above grades, 0.5 was added to the smaller number. Thus a foam intermediate to "3" and "4", was designated as having a "3.5" rating.

***Average thermal expansion of foam × $10^7$ over the range zero to 800°C.

TABLE V

| Sealant Example | Glass of Example: | Amount — Weight Percent Glass | SiC | ZnO | heat Treatment | Foam | Expansion* |
|---|---|---|---|---|---|---|---|
| 21 | 2 | 96.7 | 3.3 | 0 | B | 0 | −2.1 |
| 22 | 2 | 88.7 | 3.3 | 8 | B | 1.5 | −9.9 |
| 23 | 2 | 88.7 | 3.3 | 8 | C | 4 | −12.0 |
| 24 | 2 | 94.7 | 3.3 | 2 | C | 0 | |
| 25 | 3 | 96.7 | 3.3 | 0 | C | 0 | |
| 26 | 3 | 94.7 | 3.3 | 2 | C | 0 | |
| 27 | 3 | 88.7 | 3.3 | 8 | C | 3.5–4 | |
| 28 | 3 | 84.2 | 3.3 | 12.5 | C | 5 | |
| 29 | 3 | 81.7 | 3.3 | 15 | B | 3.5 | −8.1 |
| 30 | 4 | 96.7 | 3.3 | 0 | B | 0 | |
| 31 | 4 | 88.7 | 3.3 | 8 | B | 0 | |
| 32 | 4 | 84.2 | 3.3 | 12.5 | B | 0 | |
| 33 | 4 | 81.7 | 3.3 | 15 | B | 0 | |
| 34 | 5 | 96.7 | 3.3 | 0 | C | 0 | |
| 35 | 5 | 94.7 | 3.3 | 2 | C | 2 | |
| 36 | 5 | 88.7 | 3.3 | 8 | B | 1.5 | −9.4 |
| 37 | 5 | 84.2 | 3.3 | 12.5 | B | 3.5 | −5.6 |
| 38 | 5 | 81.7 | 3.3 | 15 | B | 4.5 | |
| 39 | 7 | 96.7 | 3.3 | 0 | C | 0 | |
| 40 | 7 | 94.7 | 3.3 | 2 | C | 0 | |
| 41 | 7 | 81.7 | 3.3 | 15 | A | 2 | |
| 42 | 8 | 96.7 | 3.3 | 0 | C | 0 | |
| 43 | 8 | 94.7 | 3.3 | 2 | C | 1.5 | |
| 44 | 8 | 84.2 | 3.3 | 12.5 | C | 5 | |
| 45 | 8 | 81.7 | 3.3 | 15 | B | 1.5 | |
| 46 | 9 | 96.7 | 3.3 | 0 | B | 0 | |
| 47 | 9 | 88.7 | 3.3 | 8 | B | 0 | |
| 48 | 10 | 88.7 | 3.3 | 8 | B | 4 | |
| 49 | 10 | 88.7 | 3.3 | 12.5 | B | 4 | |
| 50 | 6 | 96.7 | 3.3 | 0 | B | 0 | −6.0 |
| 51 | 6 | 96.7 | 3.3 | 0 | C | 3½ | −0.7 |
| 52 | 6 | 94.7 | 3.3 | 2 | C | 4.5 | |
| 53 | 6 | 88.7 | 3.3 | 8 | B | 2.5 | |
| 54 | 6 | 88.7 | 3.3 | 8 | C | 4 | |
| 55 | 6 | 84.2 | 3.3 | 12.5 | A | 2 | |
| 56 | 6 | 84.2 | 3.3 | 12.5 | B | 3 | |
| 57 | 6 | 81.7 | 3.3 | 15 | B | 3 | −3.4 |

*Average thermal expansion of foam × $10^7$ over the range zero to 800°C.

The relationship of the amounts of ZnO and the temperature treatment to which the sealants are subjected is fully set forth in the above table and it can be seen that, in many instances, an increase in the ZnO will produce more foaming, even though the same temperature treatment is used, as shown with sealants 34–38 containing glasses of Example 5. In other instances, too high a temperature may result in unsatisfactory foaming, as evidenced by Examples 26–29 where, with 12.5% ZnO, the C heat treatment gave a 5 foam whereas the B heat treatment gave a foam rated 3 (see Table V). The sealants of Examples 30–33 did not foam at all since the amount of $CeO_2$ in the glass is apparently too low. A slight increase in $CeO_2$, as appears in Example 9 glasses will produce a sealant, Example 19, which will foam at a temperature of 2300°F (see Table III). An even higher increase in $CeO_2$, as appears in the sealants of Examples 21–25, 34–38, 48, 49, and others, facilitates the foaming of the sealant, upon firing. It has been found that the amount of $CeO_2$ which must be present in the glass used in the sealant should be from about 1 to about 7 percent by weight of the glass. The minimum amount of $CeO_2$ will fall between the 0.6 percent present in the glass of Example 4 and the 1.1 percent of Example 9.

Several sealants of the invention were tested for thermal stability after being subjected to high temperatures over a period of time and the results are set forth in Table VI. Thermal or dimensional stability was measured using a Pratt and Whitney Supermicrometer, Model B. The samples were held at 800°C for the indicated times, cooled to room temperature, and the increase or decrease in sample lengths measured.

TABLE VI

| Example | Time at 800°C | Change in Length (ppm)* |
|---|---|---|
| 11 | 100 hours | −80 |
| | 500 hours | −20 |
| | 1000 hours | +43 |
| 12 | 100 hours | −36 |
| | 250 hours | −62 |
| 13 | 100 hours | −110 |
| | 250 hours | −103 |
| | 500 hours | −49 |
| 17 | 250 hours | −14 |
| | 400 hours | −47 |
| 18 | 100 hours | −135 |
| | 250 hours | −33 |

*Parts per million.

The sealants of the present invention have a dimensional stability resulting in a change in length of from about −175 to +175 parts per million when held at a temperature of 800°C for a period of 1000 hours or more. The preferred sealants are those having a change in length of less than 100 parts per million either positive or negative, with the most preferred sealants having a change in length of less than 50 parts per million.

Seal strengths of the sealants of the invention bonded to glass-ceramic surfaces were measured by push-out tests. A glass-ceramic post having a diameter of ¾ inch and a thickness of ½ inch was sealed within a glass-ceramic ring or similar composition and having a 7/8 inch inner diameter, 2 inches outer diameter, and a thickness of ½ inch. The sealant completely filled the annular space between the post and the inner diameter of the ring. After firing and foaming of the sealant, a force was exerted on each post and the shear force required to push out the post was calculated in pounds per square inch of shear stress on the outer diameter of the post.

Sealants of Example 11 of Table III were fired at a rate of 100°F/hour until the temperature of 2150°C was reached and were held at this temperature for 10 hours before being cooled to 1700°F at a rate of 50°F/hour and to room temperature at the rate of 100°F per hour. The shear force required to rupture the seals between the posts and the rings averaged about 1600 psi.

The composition of the glass-ceramic used for the push-out tests was as follows:

| Ingredients | Weight Percent |
|---|---|
| $SiO_2$ | 73 |
| $Al_2O_3$ | 17.7 |
| $Li_2O$ | 4.2 |
| $TiO_2$ | 1.4 |
| $ZrO_2$ | 1.6 |
| ZnO | 1.7 |
| $Sb_2O_3$ | 0.3 |

This glass-ceramic has a coefficient of thermal expansion of $-2.7 \times 10^{-7}/°C$ (25°–800°C) and a thermal dimensional change after 2000 hours at 1500°F of $-150$ parts per million.

While the sealant of one embodiment of the invention consists essentially of (1) the glass frit of the composition described above containing the four essential ingredients $SiO_2$, $Al_2O_3$, $Li_2O$ and $CeO_2$, (2) ZnO and (3) SiC, another embodiment of the invention discloses a sealant which does not have to have any ZnO. This is shown in Table V for the sealant of Example 51 wherein 3.3 weight percent SiC is utilized but no ZnO. At a firing temperature of 2300°F (Heat Treatment C) a foamed sealant rated at 3½, having an average thermal expansion of $-0.7$ (0°–800°C), was obtained. At a lower firing temperature (Heat Treatment B), no foaming of the sealant took place. As ZnO was added and the amount thereof was increased, more foaming took place at lower firing temperatures.

Minor amounts of other compatible metal oxides can be present in the sealant of the invention as long as they do not materially affect the basic characteristics of the sealant: For example, alkali metal oxides, such as $Na_2O$ can be present in the glasses as shown in Examples 5 and 10 of Table II. However, such alkali metal oxides should not be present in an amount over about 1 percent by weight of the glass. CuO, CdO, MgO, $B_2O_3$ and like metal oxides can also be present in minor amounts. However, since the sealants of the invention have a predominantly keatite crystalline phase when fired, which assures a low coefficient of thermal expansion for the seal, the presence of other metal oxides in the glass batch may result in the formation of unwanted phases, either crystalline or glass, which will deleteriously affect the expansion characteristics of the final product or decrease its thermal stability. For instance, analysis of the preferred sealant composition of the invention, Example 11, by X-ray diffractometer using the powder method shows that it has keatite as the predominant phase and willemite (zinc orthosilicate) as the minor phase with only trace amounts of cristobalite and $CeO_2$ and very little glass.

$As_2O_3$ and $Sb_2O_3$ can also be present in the glass as fining agents, although they are not necessary to achieve good foaming results, as is apparent from the data shown in Tables II and III where these ingredients are omitted from the glasses.

In any event, the amount of other compatible metal oxides should not exceed about 10 percent, and preferably not about 5 percent by weight of the glasses, depending upon the undesirable crystalline phases they may produce or whether the presence of such oxides adversely affects the firing temperature, the foaming properties, etc. of the sealant.

While ZnO can be present in minor mounts in the glass and is added separately as a powder to the sealant batch, no reason is known why at least a portion of the ZnO, say about 50 percent, if not all, cannot be incorporated in the glass so that the sealant batch consists essentially of the glass containing ZnO and the SiC powder, and with a minor amount of ZnO powder if the glass does not have sufficient ZnO to produce the sealant of the invention. The amount of ZnO which can be incorporated into the glass will depend upon the amount to be used with the particular composition. Of course, if, say 12–15 percent ZnO is to be present, it is realized that not all of this can be incorporated into the glass. On the other hand, if 2 to 4 percent or more ZnO is to be used, such small amounts can all be in the glass.

While the invention has been described in terms of glasses having $CeO_2$ incorporated therein, it has also been found that $CeO_2$ can be added as a powder to a $SiO_2$-$Al_2O_3$-$Li_2O$ glass together with ZnO and SiC powders, and the resultant sealant has good foaming and sealing properties.

A glass was formed by melting 2860 parts Ottawa Silica, 918.3 parts Alcoa Alumina A-10 and 612 parts lithium carbonate, all parts being by weight. The glass which was formed and fritted was analyzed as having 71.1 weight percent $SiO_2$, 23.1 weight percent $Al_2O_3$ and 5.95 weight percent $Li_2O$. 80.1 parts by weight of the glass frit was mixed with 3.8 parts by weight $CeO_2$ powder, 12.8 parts by weight ZnO powder and 3.3 parts by weight SiC powder. The sealant was fired at a rate of 300°F/hour to 2192°F and held there for 4 hours, and then cooled to room temperature at a rate of 150°F/hour. The resulting foamed sealant had a rating of 3. Its coefficient of thermal expansion was $-5.1 \times 10^{-7}/°C$ (0°–800°C).

It has also been found that in those sealants where the $CeO_2$ content of the glass is about 2 mole percent or more, such as in the sealant of Example 51, there is no need to mix the glass frit with ZnO and long as the firing temperature is greater than 2200°F and preferably is about 2300°F. Foaming occurs in the presence of SiC and with the absence of ZnO as is evident from Table VI. As ZnO is added to the sealant batch in increasing amounts, the firing temperature necessary for the sealant to produce a good foamed seal is progressively reduced.

The coefficients of thermal expansion for the sealants formed in accordance with the present invention fall within the range of from $-15 \times 10^{-7}/°C$ to $+10 \times 10^{-7}/°C$ over the range of 0°–800°C, with the preferred range being from $-12$ to $+6 \times 10^{-7}/°C$ (0°–800°C).

While the foaming sealants of the invention have been discussed in terms of sealing glass-ceramic bodies together, which bodies have previously been formed from a thermally crystallizable glass, such sealants can also be used to seal such glasses, per se, whereby the firing temperatures and schedule for foaming the sealants can be made to coincide with the nucleation and crystallization temperatures of the glass bodies being sealed.

What is claimed is:

1. A foaming sealant for sealing together thermally crystallizable glass or glass-ceramic bodies upon firing of said sealant, said sealant consisting essentially of:
   a. about 80–99 weight percent of a glass frit consisting essentially of, in weight percent, 54–80 $SiO_2$, 14–32 $Al_2O_3$, 3–8 $Li_2O$, 0–9 ZnO and 0–7 $CeO_2$, wherein the mole ratio of ($Li_2O$ + ZnO) : $Al_2O_3$ is from 0.7 to 1.2 and the molar ratio of $Li_2O$ : ZnO is at least 2,
   b. zero to 15 weight percent of particulate ZnO,
   c. zero to 6 weight percent of particulate $CeO_2$, and
   d. a sufficient amount of particulate SiC which, upon firing of said sealant, will decompose to evolve a gas for foaming said sealant during said firing,
wherein the total ZnO in the sealant is not over 15 weight percent of the sealant and is at least 2 weight percent of the sealant when the $CeO_2$ component of glass component (a) is less than 2 mole percent thereof; and wherein said $CeO_2$ in said sealant is in an amount sufficient to effect the decomposition of the said SiC to evolve said gas for foaming said sealant, said amount of $CeO_2$ being from about 1 to about 7 weight percent.

2. The foaming sealant as defined in claim 1 wherein said sealant, after firing, exhibits a change of length of less than 175 parts per million after long exposure to temperatures up to 800°C.

3. The foaming sealant as defined in claim 2 wherein said sealant, after firing, exhibits a change of length of less than 100 parts per million after long exposure to temperatures up to 800°C.

4. The foaming sealant as defined in claim 1 wherein said sealant, after firing, has an average coefficient of thermal expansion over the temperature range 0°–800°C of from about $-15 \times 10^{-7}$/°C to about $10 \times 10^{-7}$/°C.

5. The foaming sealant as defined in claim 4 wherein said average coefficient of thermal expansion is from about $-12$ to $+6 \times 10^{-7}$/°C over the temperature range of 0°–800°C.

6. The sealant as defined in claim 1 wherein said ZnO, if present, has at least a portion thereof present as a part of said glass frit composition.

7. The sealant as defined in claim 6 wherein all of said ZnO is present as a part of said glass frit composition.

8. A foaming sealant of claim 1 wherein about 80–97 weight percent thereof is said glass frit.

9. A foaming sealant of claim 1 wherein SiC is present in said sealant in an amount of about 1 to about 5 weight percent of said sealant.

10. A foaming sealant of claim 1 wherein at least 1 weight percent of said glass frit is $CeO_2$.

11. A foaming sealant of claim 1 wherein at least 2 mole percent of said glass frit is $CeO_2$.

12. The foaming sealant as defined in claim 11 wherein said particulate SiC is present in an amount of from about 1 to about 5 percent by weight of said sealant.

13. A foaming sealant for sealing together thermally crystallizable glass or glass-ceramic bodies upon firing of said sealant, said sealant consisting essentially of:
   a. about 80–99 weight percent of a glass frit consisting essentially of, in weight percent, 54–80 $SiO_2$, 14–32 $Al_2O_3$, 3–8 $Li_2O$, 0–9 ZnO and about 1–7 $CeO_2$, wherein the mole ratio of ($Li_2O$ + ZnO) : $Al_2O_3$ is from 0.7 – 1.2 and the molar ratio of $Li_2O$ : ZnO is at least 2,
   b. zero to 15 weight percent of particulate ZnO,
   c. zero to 6 weight percent of particulate $CeO_2$, and
   d. a sufficient amount of particulate SiC which, upon firing of said sealant, will decompose to evolve a gas for foaming said sealant during said firing,
wherein the total ZnO in the sealant is not over 15 weight percent of the sealant and is at least 2 weight percent of the sealant when the $CeO_2$ component of glass component (a) is less than 2 mole percent thereof; and wherein said $CeO_2$ in said sealant is in an amount sufficient to effect the decomposition of the said SiC to evolve said gas for foaming said sealant, said amount of $CeO_2$ not exceeding 7 weight percent.

14. The foaming sealant as defined in claim 1 wherein said $CeO_2$ is particulate $CeO_2$ admixed with said $SiO_2$ - $Al_2O_3$ - $Li_2O$ glass.

15. A foaming sealant for sealing together thermally crystallizable glass or glass-ceramic bodies upon firing of said sealant, said sealant consisting essentially of:
   a. about 80–99 weight percent of a glass frit consisting essentially of, in weight percent, 54–80 $SiO_2$, 14–32 $Al_2O_3$, 3–8 $Li_2O$ and 0–9 ZnO and less than 2 mole percent $CeO_2$, wherein the mole ratio of ($Li_2O$ + ZnO) : $Al_2O_3$ is from 0.7 to 1.2 and the mole ratio of $Li_2O$ : ZnO is at least 2,
   b. zero 15 weight percent of particulate ZnO,
   c. zero to 6 weight percent of particulate $CeO_2$, and
   d. a sufficient amount of particulate SiC which, upon firing of said sealant, will decompose to evolve a gas for foaming said sealant during said firing,
wherein the total ZnO in the sealant is not over 15 weight percent of the sealant and is at least 2 weight percent of the sealant; and wherein said $CeO_2$ in said sealant is in an amount sufficient to effect the decomposition of the said SiC to evolve said gas for foaming said sealant, said amount of $CeO_2$ not exceeding 7 weight percent.

* * * * *